United States Patent [19]

Torimae et al.

[11] 4,221,572

[45] Sep. 9, 1980

[54] ABRASIVE MATERIAL HAVING A POLYCARBODIIMIDE AND POLYURETHANE RESIN BINDER

[75] Inventors: Yasuhiro Torimae; Tamio Ishiai, both of Wakayama, Japan

[73] Assignee: Kao Soap Company, Tokyo, Japan

[21] Appl. No.: 882,795

[22] Filed: Mar. 2, 1978

[30] Foreign Application Priority Data

Mar. 3, 1977 [JP] Japan .................................. 52/23008

[51] Int. Cl.$^2$ .......................... B24B 1/00; B24B 37/02
[52] U.S. Cl. ...................................... 51/298; 51/296; 521/901; 528/51
[58] Field of Search ........................ 51/298, 295, 296; 521/901, 106, 107; 260/858; 528/51, 57

[56] References Cited

U.S. PATENT DOCUMENTS

| | | | |
|---|---|---|---|
| 3,029,209 | 4/1962 | Ferrigno | 51/298 |
| 3,193,522 | 7/1965 | Neumann et al. | 521/901 |
| 3,226,368 | 12/1965 | Reischl et al. | 521/901 |
| 3,377,411 | 4/1968 | Charvat | 51/298 |
| 3,929,733 | 12/1975 | Alberino et al. | 521/901 |
| 4,010,220 | 3/1977 | Gruffaz | 260/858 |

*Primary Examiner*—Donald J. Arnold
*Attorney, Agent, or Firm*—Birch, Stewart, Kolasch & Birch

[57] ABSTRACT

An abrasive material which comprises abrasive grains and a polycarbodiimide and polyurethane resin as the binder for the abrasive grains and a method of preparation thereof are disclosed. The polycarbodiimide and polyurethane resin is prepared by reacting a polyisocyanate and a polyol in the presence of a catalyst. The resin has a specified amount of carbodiimide bonding and urethane bonding.

11 Claims, No Drawings

ABRASIVE MATERIAL HAVING A POLYCARBODIIMIDE AND POLYURETHANE RESIN BINDER

FIELD OF THE INVENTION

This invention relates to an abrasive material, especially to an abrasive material which consists of abrasive grains and a polycarbodiimide and polyurethane resin as the binder for the abrasive grains and a method of preparation thereof.

BACKGROUND OF THE INVENTION

Generally, a polishing material includes abrasive grains and a binder. Several kinds of polishing materials can be manufactured by controlling the kinds or ratio of those elements in accordance with particular polishing requirements and, if necessary, by adding a filler or a reinforcement.

Natural abrasive grains have been in use heretofore, but, artificial abrasive grains, which have advantages in hardness, strength and thermal resistance have been used frequently more recently.

Vitrified inorganic binders and organic binders have been used with abrasive materials. Phenolic resins are popular organic binders.

Vitrified inorganic binders have the disadvantages that they are glassy and fragile. Phenolic resins are hard for an organic binder, but are also fragile and are likely to be broken down by the vibration while polishing as a result of the lack of bonding strength.

In order to overcome these disadvantages, an abrasive material, containing polyurethane resin as a binder, has been proposed lately, as described in U.S. Pat. No. 3,770,555. Since polyurethane resin has a low softening point (about 140° C.), it cannot be used except under such conditions that the temperature is controlled below its softening point, for example, in water.

A synthetic resin that is excellent in thermaal resistance is not always suitable as a binder for abrasive material. In order to determine what resin is suitable, the following properties should be evaluated: abrasive grain binding, friction resistance (lubricity resulting from the self-wearing of the binder while polishing) and self-sharpening.

SUMMARY OF THE INVENTION

We have found that an abrasive material which consists essentially of abrasive grains and a polycarbodiimide and polyurethane resin as the binder for the abrasive grains, has good properties, that is, good abrasive grain binding, good thermal resistance and good friction resistance. We also have found that the hardness of such resin can be controlled easily and that the abrasive material can be formed with ease and is suitable for a large scale production.

In accordance with the present invention, an abrasive material having the good properties as described is obtained. The abrasive material consists essentially of abrasive grains and a polycarbodiimide and polyurethane resin as the binder for the abrasive grains; said resin having from 0.5 to 10 gram equivalents of carbodiimide bonding and at least 0.5 gram equivalents of urethane bonding in 1000 grams of the resin.

DESCRIPTION OF PREFERRED EMBODIMENT

The polycarbodiimide and polyurethane resin itself is prepared from a polyisocyanate and a polyol according to the method known to one skilled in the art.

Carbodiimide bonding takes place when isocyanate compounds are heated in the presence of a carbodiimidation catalyst according to the reaction (A):

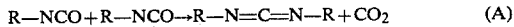

$$R-NCO + R-NCO \rightarrow R-N=C=N-R + CO_2 \quad (A)$$

Urethane bonding takes place when an isocyanate compound is reacted with a compound having hydroxyl group according to the reaction (B):

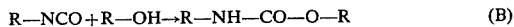

$$R-NCO + R-OH \rightarrow R-NH-CO-O-R \quad (B)$$

We have found that the polycarbodiimide and polyurethane resin, for use in accordance with the present invention, should meet the following qualifications:

The first is that it contain from 0.5 to 10, preferably from 0.7 to 8, more preferably from 1 to 3 gram equivalents of carbodiimide bonding per 1000 grams of the resin. If the content of carbodiimide bonding per 1000 grams of the resin is less than 0.5 gram equivalent, the thermal resistance of the abrasive material is not sufficient. On the contrary if the content is more than 10 gram equivalents, the static thermal resistance is improved but becomes fragile. The property of the latter case (more than 10 gram equivalents) is similar to that of an isocyanurate resin (the trimerization product of isocyanate compound).

The second is that it contain at least 0.5 gram equivalents, preferably from 0.7 to 6, more preferably from 1 to 3 gram equivalents of urethane bonding per 1000 grams of the resin. If the content of the urethane bonding per 1000 grams of the resin is less than 0.5 gram equivalent, the thermal resistance of the abrasive material is not sufficient. There is no critical upper limit for the content of the urethane bonding, but the usual polycarbodiimide and polyurethane resin which is prepared from a polyisocyanate and a polyol contains at most 8 gram equivalents of urethane bonding per 1000 grams of the resin.

The abrasive material of this invention is prepared by heating the mixture of a polyisocyanate, a polyol and abrasive grains in the presence of a carbodiimidation catalyst.

POLYISOCYANATE

The polyisocyanates which may be employed in accordance with the present invention include any of those which are useful for the preparation of a polyurethane resin. These include both di- and other polyisocyanates as well as aromatic and aliphatic isocyanates. Representative isocyanates which may be employed include, for example, tolylene diisocyanate (TDI); diphenyl methane diisocyanate (MDI); para-phenylene diisocyanate; 1-methoxy-phenylene 2,4 diisocyanate; diphenylene 4,4 diisocyanate; toluene 2,4,6-triisocyanate; 1-ethyl-benzene 2,4-diisocyanate; triphenyl methane 4,4',4"-triisocyanate; xylene diisocyanate; 1,5-naphthylene diisocyanate; isophorone diisocyanate; and hexamethylene diisocyanate.

POLYOL

The polyols which may be used in accordance with the present invention include any of those which are useful for the preparation of a polyurethane resin. These include diols, and other polyols, as well as polyetherpolyols and polyesterpolyols. Preferable examples of these polyols include; polyethylene glycol, polypropylene glycol, polyetherpolyols prepared by adding ethylene oxide or propylene oxide to glycerine, trimethylol propane, pentaerythritol, sorbitol, and sucrose; polyesterpolyols prepared by reacting a polyol with a polybasic acid, such as adipic acid, phthalic acid, or terephthalic acid.

CARBODIIMIDATION CATALYST

Any of the catalysts which are useful in the preparation of polycarbodiimide and polyurethane resins may be employed in accordance with the present invention. Representative catalysts which may be utilized include, for example, an alkyl phosphate, preferably alkali metal salts of a monoalkyl phosphate, a dialkyl phosphate, and mixtures thereof, the alkyl groups of which contain from 6 to 18 carbon atoms. Typical examples of these catalysts are; dipotassium mono-2-ethylhexyl phosphate, monopotassium di-2-ethylhexyl phosphate, disodium monolauryl phosphate, and monosodium dilauryl phosphate. It is convenient to employ an equimolar mixture of alkali metal salts of a monoalkyl phosphate and a dialkyl phosphate having the same alkyl groups.

A lower molecular weight polyethylene glycol, such as diethylene glycol, is a convenient solvent for most carbodiimidation catalysts.

ABRASIVE GRAIN

The abrasive grains are not critical in accordance with the present invention. Representative abrasive grains which may be employed include, for example, diamond; emery; corundum; pumice; quartz; diatomaceous earth; china clay; magnetite; limestone; alumina; silicon carbide; boron carbide; metals and metal oxides; and silicates.

As mentioned above, in accordance with the present invention, the abrasive material is prepared by heating the mixture of a polyisocyanate, a polyol and abrasive grains in the presence of a carbodiimidation catalyst. A polyisocyanate and a polyol can be reacted to produce a urethane prepolymer prior to mixing with the abrasive grains.

One of the preferred embodiments of the method of preparing the abrasive material is as follows:

(1) reacting polyol with polyisocyanate, at from 20° to 100° C., preferably from 50° to 80° C. for from 0.1 to 5 hours, preferably from 0.5 to 2 hours, whereby substantially all hydroxyl groups of the polyol are converted into urethane bondings and a urethane prepolymer having terminal isocyanate groups is prepared.

(2) mixing said urethane prepolymer with carbodiimidation catalyst and abrasive grains and, if desired, with fillers or reinforcements. Carbodiimidation catalyst may be added preferably as a solution in a polyol having a lower molecular weight and primary hydroxyl groups, such as diethylene glycol. Preferably, a carbodiimidation catalyst may be mixed with the urethane prepolymer before the abrasive grains are blended. The resulting mixture may be filled in a mold or pressed on a reinforcement.

(3) heating the resulting mixture, at from 20° to 200° C. preferably from 100° to 150° C. for from 0.5 to 10 hours, preferably from 1 to 4 hours, whereby substantially all remaining isocyanate groups of the urethane prepolymer are converted into carbodiimide bondings and the abrasive grains are bound to the resulting polycarbodiimide and polyurethane resin. Optimum reaction may be achieved by heating at about 120° C. for about 2 hours.

Another preferred embodiment of the method of preparing the abrasive material is as follows:

(1) mixing polyisocyanate, polyol, abrasive grains and carbodiimidation catalyst. Carbodiimidation catalyst may be added preferably as a solution in a polyol having a lower molecular weight and primary hydroxyl groups, such as diethylene glycol. A small amount of a urethane reaction catalyst, such as polyethylene polyamine can also be added, if desired. The resulting mixture may be filled in a mold or pressed on a reinforcement.

(2) heating the resulting mixture at from 20° to 200° C., preferably from 100° to 150° C., for from 0.5 to 10 hours, preferably from 1 to 4 hours, whereby substantially all hydroxyl groups are converted into urethane bondings and substantially all remaining isocyanate groups are converted into carbodiimide bondings. The abrasive grains are bound to the resulting polycarbodiimide and polyurethane resin.

The molar ratio of isocyanate groups in the polyisocyanate to hydroxyl groups in the polyol (NCO/OH) in accordance with the present invention is from 1.5 to 10, preferably from 2.0 to 5.0. The content of carbodiimide bonding and that of urethane bonding in the resin may be controlled by regulating the ratio of the equivalence of the polyisocyanate to the equivalence of the polyol (NCO/OH). The content of carbodiimide bonding and that of urethane bonding in the resin can be calculated based on the equivalence of the polyisocyanate and that of the polyol and the weights thereof. For example, when 200 grams of polyol (OH equivalent=200) and 350 grams of polyisocyanate (NCO equivalent=87) are used, the amount of hydroxyl groups in the polyol equals 1.00 gram equivalent and the amount of isocyanate groups in the polyisocyanate equals 4.02 grams equivalents (i.e. 350−87), the ratio of the isocyanate groups to the hydroxyl groups (NCO/OH) amounting to 4.02 (i.e. 4.02−1.00). As substantially all hydroxyl groups are converted into urethane bonding according to the reaction (B), and substantially remaining all isocyanate groups are converted into carbodiimide bonding according to the reaction (A), the content of urethane bonding in the resulting resin is 1.00 gram equivalent and the content of carbodiimide bonding in the resulting resin is 1.51 gram equivalents (i.e. (4.02−1.00)−2). In the meantime, 66 grams (i.e. 44×1.51) of carbon dioxide gas produced according to the reaction (B) is lost, and the weight of the resulting resin is about 484 grams (i.e. 200+350−66). Consequently, the content of carbodiimide bonding in 1000 grams of resin equals about 3.12 gram equivalents and that of urethane bonding in 1000 grams of resin equals about 2.07 gram equivalents, respectively.

The amount of the carbodiimidation catalyst is not critical but it is preferred to employ from 0.3 to 3 weight percent based on the total amount of polyisocyanate and polyol.

While the weight ratio of the abrasive grains to the resin can be changed within a wide range, from ½ to 20/1 is preferred, and from 2/1 to 10/1 is particularly preferred.

The abrasive material of the present invention can also contain any other materials which are conventionally used as ingredients in abrasive products within such ranges that they do not deleteriously affect the abrasive material. One type of such other materials is a filler, for example, cryolite; perlite, calcium sulfate; calcium carbonate, potassium borofluoride; or zinc sulfide. Still other material is a reinforcement, for example, glass fibers; natural or synthetic fibers; metal filaments; and paper.

The advantages offered by the present invention can be more readily understood by reference to the following examples. These examples are set forth primarily for the purpose of illustration.

EXAMPLE 1

A mixture of 200 grams of triol prepared by reacting propylene oxide with glycerin (OH equivalent=200) and 350 grams of tolyene diisocyanate (TDI, NCO equivalent=87) (the NCO/OH of the mixture equals 4.02) was gradually heated up to 70° C. for 30 minutes under stirring and left standing for 1 hour at that temperature. The resulting urethane prepolymer had a viscosity of 900 c.p. (at 30° C.) and a NCO weight percent of 23.1. Thus, substantially all hydroxyl groups were converted to urethane bondings. To 100 grams of the urethane prepolymer, 3 grams of 30 weight percent of a diethylene glycol (OH equivalent=53) solution of an equimolar mixture of dipotassium mono-2-ethylhexyl phosphate and monopotassium di-2-ethylhexyl phosphate was added (the NCO/OH ratio became 3.30).

Fifty grams of the mixture was blended with 300 grams of alumina (abrasive grains) and the blend was stirred for 1 minute at room temperature, was filled in a disk-shaped mold made of metal having a diameter of 13 cm and a thickness of 1 cm, and pressed at room temperature. Then the mold was placed in an oven at 120° C. for two hours, was taken out to stand until it had cooled to room temperature; then, the abrasive material was taken out of the mold.

This abrasive material had a bulk density of 2.0, was porous and the abrasive grains were dispersed uniformly. The content of carbodiimide bonding in 1000 grams of the binder resin was 2.80 gram equivalents and that of urethane bonding was 2.44 gram equivalents, respectively.

After being dressed into a disk having a diameter of 12.5 cm, the performance of the polishing material was tested by polishing black rust off steel plate.

| Test Machine: | Perfect pressure-type plane grinding machine |
|---|---|
| Pressure: | 5kg/cm2 |
| Rotation Frequency | 1,500 and 2,500 rpm |
| Feed Speed of the Steel Plate: | 0.1 m/sec. |

The polishing material maintained steady polishing ability for 10 minutes at 1,500 rpm and, after dressing, for 10 minutes at 2,500 rpm.

EXAMPLE 2

A urethane prepolymer having terminal NCO groups was prepared by reacting 100 grams of tolylene diisocyanate (TDI, NCO equivalent=87) with 200 grams of a polyol mixture consisting of 108.4 grams polypropylene glycol (OH equivalent=500), 33.2 grams of triol prepared by adding propylene oxide with glycerin (OH equivalent=350) and 58.4 grams of triol prepared by adding propylene oxide and ethylene oxide with glycerin (OH equivalent=1000) (NCO/OH=3.11) under the same conditions as in Example 1.

The viscosity of the prepared urethane prepolymer was 3,500 c.p. (at 30° C.) and its NCO weight percent was 10.91.

An abrasive material was prepared from 100 grams of this urethane prepolymer by the same method as described in Example 1. The ratio of NCO groups to OH groups (NCO/OH) after adding the carbodiimidation catalyst solution in ethylene glycol was 2.35. The content of carbodiimide bonding in 1000 grams of the resin was 1.13 gram equivalents and that of urethane bonding was 1.67 gram equivalents. The bulk density of the polishing material was 2.1.

This abrasive material maintained steady polishing ability for 10 minutes like that of Example 1.

EXAMPLE 3

A urethane prepolymer was prepared by reacting 110 grams of tolylene diisocyanate (TDI, NCO equivalent=87) and 200 grams of diol prepared by the esterification of adipic acid with an equimolar mixture of ethylene glycol and 1,4-butane diol (OH equivalent=448) under the same conditions as in Example 1. The viscosity of the prepared urethane prepolymer was 9000 c.p. and the NCO weight percent was 11.1.

An abrasive material was prepared from 100 grams of this urethane prepolymer by the same manner as in Example 1. The ratio of NCO groups to OH groups (NCO/OH) after adding the carbodiimidation catalyst solution was 2.22. The content of carbodiimide bonding in 1000 grams of the resin was 1.15 gram equivalents and that of urethane bonding was 1.89 gram equivalents, respectively. The bulk density of the abrasive material was 2.1.

This abrasive material also maintained steady polishing ability for ten minutes.

EXAMPLE 4

300 grams of diphenyl methane diisocyanate (MDI, NCO equivalent=125) was stirred and heated at 45° C. 200 grams of a polyol mixture containing equal weights of a triol prepared by reacting propylene oxide with glycerin (OH equivalent=1000) and a polypropylene glycol (OH equivalent=500) were dropped into the MDI over a period of thirty minutes with stirring. After completing addition of the polyol, the mixture was heated to 70° C. and then cooled to room temperature. The resulting urethane prepolymer had a viscosity of 6000 c.p. (at 30° C.) and an NCO weight percent of 16.9.

An abrasive material was prepared from 100 grams of this urethane prepolymer in the same manner as in Example 1. The ratio of NCO groups to OH groups (NCO/OH) after adding the carbodiimidation catalyst solution was 4.82. The content of carbodiimide bonding in 1000 grams of the resin was 2.03 gram equivalents and that of urethane bonding was 1.06 gram equivalents.

This abrasive material also maintained steady polishing ability for 10 minutes.

EXAMPLE 5

In 100 grams of the same polyol mixture as employed in Example 2, 4.5 grams of the same diethylene glycol solution of carbodiimidation catalyst as employed in Example 1 and 0.6 grams of triethylene diamine were mixed. Thirty-four grams of the mixture was blended in 300 grams of alumina (abrasive grains), stirred for one minute, and 16.2 grams of tolylene diisocyanate (TDI, NCO equivalent=87) was blended and stirred for thirty seconds. The blend was put in a mold and heated in the same manner as in Example 1.

The ratio of NCO groups to OH groups (NCO/OH) was 2.35. The content of carbodiimide bonding in 1000 grams of the resin was 1.14 gram equivalents and that of urethane bonding was 1.67 gram equivalents.

This abrasive material had the same performance as that of Example 2.

COMPARATIVE EXAMPLE

Into 80 grams of the mixture of 50 weight parts of triol prepared by reacting propylene oxide with glycerin (OH equivalent=1000), 50 weight parts of triol prepared by reacting propylene oxide with glycerin (OH equivalent=350), 2 weight parts of water and 0.3 weight parts of triethylene diamine, 25 grams of tolylene diisocyanate (TDI) was added and the mixture was stirred for 30 seconds. Then, 50 grams of the mixture was blended with 300 grams of alumina (abrasive grains). The blend was put in a disk-shaped mold made of metal having a diameter of 13 cm and a thickness of 1 cm, and it was pressed at room temperature. Then the mold was placed in an oven heated at 70° C. for 30 minutes and at 120° C. for two hours. It was taken out of the oven, and left to cool to room temperature. The abrasive material was taken out of the mold.

This abrasive material had a bulk density of 2.1 and the content of urethane bonding and urea bonding (—NH—CO—NH—) in 1000 grams of the resin were 1.49 and 0.86 gram equivalents, respectively.

The performance of this abrasive material was tested by the same manner as in Example 1. After two minutes at the rotational frequency of 1500 rpm, and after one minute at the rotational frequency of 2500 rpm, it lost the polishing ability as a result of loading and softening of the binder on the polishing face. It could not be used unless dressed again.

What is claimed is:

1. An abrasive material consisting essentially of:
   (a) abrasive grains, and
   (b) a polycarbodiimide and polyurethane resin as the binder for said abrasive grains, having from 0.5 to 10 gram equivalents of carbodiimide bonding and at least 0.5 gram equivalents of urethane bonding per 1000 grams of the resin.

2. An abrasive material according to claim 1 in which said polycarbodiimide and polyurethane resin has from 0.7 to 8 gram equivalents of carbodiimide bonding per 1000 grams of the resin.

3. An abrasive material according to claim 1 in which said polycarbodiimide and polyurethane resin has from 0.7 to 6 gram equivalents of urethane bonding per 1000 grams of the resin.

4. An abrasive material according to claim 1 consisting essentially of:
   (a) from ½ to 20 weight parts of abrasive grains, and
   (b) 1 weight part of polycarbodiimide and polyurethane resin as the binder for the abrasive grains, having from 0.7 to 8 gram equivalents of carbodiimide bonding and from 0.7 to 6 gram equivalents of urethane bonding per 1000 grams of the resin.

5. An abrasive material according to claim 1 in which said polycarbodiimide and polyurethane resin has from 1 to 3 gram equivalents of urethane bonding and from 1 to 3 gram equivalents of carbodiimide bonding per 1000 grams of the resin.

6. A process for preparing an abrasive material which consists essentially of
   (a) abrasive grains, and
   (b) a polycarbodiimide and polyurethane resin as the binder for said abrasive grains, said resin having from 0.5 to 10 gram equivalents of carbodiimide bonding and at least 0.5 gram equivalents of urethane bonding, both in 1000 grams of the resin, said process comprising the following steps:
   (1) mixing a polyisocyanate, a polyol and abrasive grains or mixing abrasive grains and a urethane prepolymer having terminal isocyanate groups prepared from the polyisocyanate and the polyol; and
   (2) heating the mixture at from 20° to 200° C. for 0.5 to 10 hours in the presence of a carbodiimidation catalyst selected from the group consisting of alkali metal salts of a monoalkyl phosphate, a dialkyl phosphate, and mixtures thereof, having alkyl groups containing from 6 to 18 carbon atoms.

7. A process according to claim 6 in which the molar ratio of isocyanate groups in the polyisocyanate to hydroxyl groups in the polyol is from 1.5 to 10.

8. A process according to claim 7 in which:
   (1) the urethane prepolymer having terminal isocyanate groups is prepared by reacting the polyol with the polyisocyanate at from 20° to 100° C. for 0.1 to 5 hours, whereby substantially all hydroxyl groups of the polyol are converted into urethane bondings;
   (2) the urethane prepolymer is mixed with the carbodiimidation catalyst and the abrasive grains; and
   (3) the heating of the resulting mixture results in substantially all terminal isocyanate groups of the urethane prepolymer being converted into carbodiimide bondings and the abrasive grains being bound to the resulting polycarbodiimide and polyurethane resin.

9. A process according to claim 6 in which said carbodiimidation catalyst is mixed as a solution in a polyol having a lower molecular weight and primary hydroxyl groups.

10. A process according to claim 8 in which:
    (1) the polyol is reacted with the polyisocyanate at from 50° to 80° C. for 0.5 to 2 hours;
    (2) the carbodiimidation catalyst is in a diethylene glycol solution; and
    (3) the reactant mixture is heated at from 100° to 150° C. for 1 to 4 hours.

11. A process according to claim 10 in which said carbodiimidation catalyst is an equimolar mixture of dipotassium mono-2-ethylhexyl phosphate and monopotassium di-2-ethylhexyl phosphate.

* * * * *